No. 646,245. Patented Mar. 27, 1900.
J. A. WEITZEL & U. G. SMITH.
HUB ATTACHING DEVICE.
(Application filed Jan. 3, 1900.)
(No Model.)
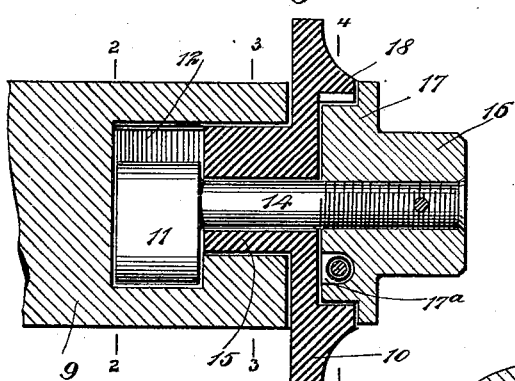
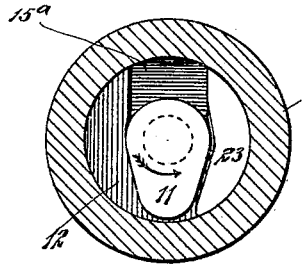
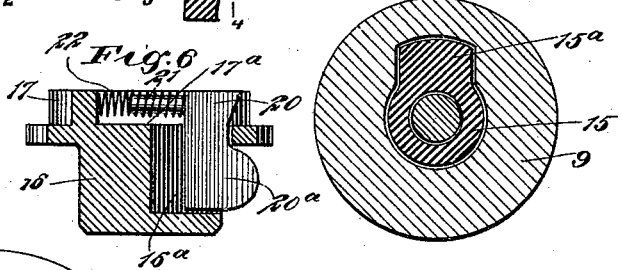
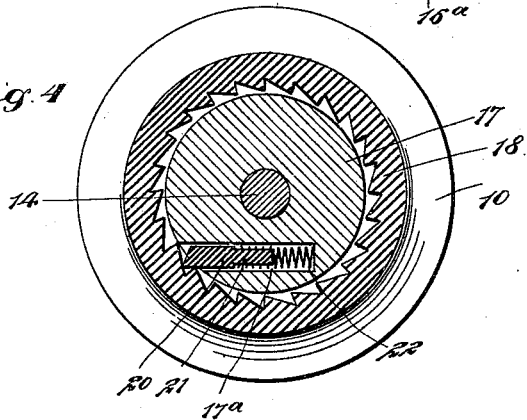
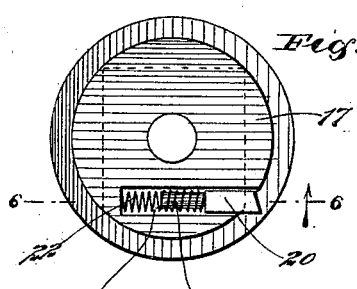
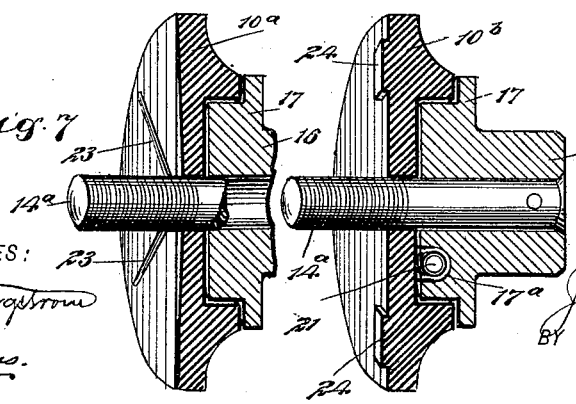
WITNESSES:
INVENTORS
ATTORNEYS

UNITED STATES PATENT OFFICE.

JOHN A. WEITZEL AND ULYSSES G. SMITH, OF DANVILLE, PENNSYLVANIA.

HUB-ATTACHING DEVICE.

SPECIFICATION forming part of Letters Patent No. 646,245, dated March 27, 1900.

Application filed January 3, 1900. Serial No. 256. (No model.)

*To all whom it may concern:*

Be it known that we, JOHN A. WEITZEL and ULYSSES G. SMITH, citizens of the United States, and residents of Danville, in the county of Montour and State of Pennsylvania, have invented a new and Improved Hub-Attaching Device, of which the following is a full, clear, and exact description.

The purpose of this invention is to provide a superior device for mounting hubs on spindles, and particularly for attaching vehicle-hubs to the spindles of the axles thereof, to which end we employ a collar with a locking device to hold it on the spindle and a peculiarly-constructed pawl-and-ratchet device arranged to control said locking device.

This specification is the disclosure of several forms of the invention, while the claims define the actual scope thereof.

Reference is to be had to the accompanying drawings, forming a part of this specification, in which similar characters of reference indicate corresponding parts in all the views.

Figure 1 is a longitudinal sectional view of the invention. Fig. 2 is a section on the line 2 2 of Fig. 1. Fig. 3 is a section on the line 3 3 of Fig. 1. Fig. 4 is a section on the line 4 4 of Fig. 1. Fig. 5 is an inner face view of the head of the locking device, showing the pawl thereon. Fig. 6 is a section on the line 6 6 of Fig. 5. Fig. 7 is a sectional perspective view of a slightly-modified arrangement, and Fig. 8 is a similar view of a further modification.

Referring to Figs. 1 to 6, the journal 9 has a hub-holding collar 10 held to the end thereof by means of a locking-dog 11, working in a cavity 12 in the journal and carried on a spindle 14, which works in a bushing 15 on the collar 10, and this bushing may be provided with a feather $15^a$, engaged in the journal, as shown, which construction is well known in the art. The movement of the dog 11 to the position shown in Figs. 1 and 2 serves to hold the collar 10 rigidly in place, and for securing this dog 11 we provide a head comprising a square outer portion 16 and a circular base 17. This head is secured rigidly to the outer end of the spindle 14 and has its circular base 17 arranged to turn inside of a circular flange 18, formed on the collar 10, the inner walls of this flange 18 being ratcheted, as shown. The square outer portion 16 of the head of the device is formed with a cavity $16^a$ therein, which opens at one of the side walls of the said square portion 16 and which runs inward into communication with a cavity $17^a$, formed in the base 17 of the head. A pawl 20 is mounted in the cavities $16^a$ and $17^a$ and has an extension $20^a$ projecting out of the cavity $16^a$ beyond one of the sides of the square portion 16, so that a wrench placed on said square portion will engage with the extension $20^a$ and throw the pawl 20 inward toward the center of the head. The pawl 20 has a pin 21 attached thereto and located in the cavity $17^a$, and this pin 21 holds a spring 22, which also is situated within the cavity $17^a$. The spring 22, being an expansive spring, pushes the pawl 20 outward and causes it normally to engage with the ratcheted inner wall of the flange 18, as shown best in Fig. 4. It will be seen, therefore, that the engagement of the pawl 20 with the ratcheted flange 18 will hold the head of the spindle 14 incapable of movement in one direction and that this engagement of the pawl with the ratcheted flange may be broken by pushing in the extension $20^a$ of the pawl. Within the spindle 9 and at one side of the cavity 12 thereof an abutment 23 is formed, against which the dog 11 is adapted to bear when in locked position and by which further movement of the dog 11 in the direction of the arrow shown in Fig. 2 is prevented. The pawl 20 is set so as to permit the movement of the dog 11 in the direction of the said arrow and so as to prevent movement of the dog reversely thereto, except when the pawl is disengaged from the ratcheted flange 18. It will be seen, therefore, that the dog 11 may be thrown freely to locked position, (which is that shown in Fig. 2,) during which movement the pawl 20 will move outwardly over the teeth on the flange 18; but the return movement of the dog will not be permitted until the pawl is thrown to disengage the ratchet. One of the special advantages of our device is that when a wrench is applied to the square portion 16 of the head to turn the head and return the dog 11 from the position shown in Fig. 2 the engagement of the wrench with the head will be accompanied by an engagement of the wrench with the part $20^a$ of the pawl, so as to automatically release the pawl.

In Figs. 7 and 8 we have shown a construction by means of which the parts 11, 14, and 15 may be dispensed with. In Fig. 7 the collar 10$^a$ is formed with scores or grooves 23 in its inner face, which serve to engage with the inner end of the journal to prevent the collar from turning, and the head, comprising the base 17 and squared outer portion 16, as previously described, has a spindle 14$^a$ secured fast therein, such spindle extending through the collar and being screw-threaded, so that it may be screwed into the journal, thus clamping the collar up rigidly against the end thereof and holding the collar in place. The collar 10$^a$, together with the head in this form of the invention, is constructed exactly the same as that previously described. In Fig. 8 the construction is the same as in Fig. 7, except that the collar 10$^b$ has small lugs 24 formed thereon to engage the journal, as will be understood, and the head 17 is provided with the recesses 16$^a$ and 17$^a$, in which the pawl 20 is located.

Having thus described our invention, we claim as new and desire to secure by Letters Patent—

1. In a hub-attaching device, the combination of a collar having an annular flange formed thereon, and the flange being ratcheted, means for holding the collar in place, a head in connection with said means and mounted to turn on the collar, the head comprising a circular base which fits within the annular flange of the collar and an outer portion adapted to receive a wrench, and a pawl carried by the head and having a portion projected beyond the said outer portion of the head, the pawl working with the ratcheted flange of the collar.

2. In a hub-attaching device, the combination of a collar, and means for holding the collar in position, such means comprising a head mounted to turn on the collar and having an angular portion to be engaged by a wrench, and a pawl carried in the head and working with the collar to hold the head, the pawl having a portion projected above the angular portion of the head to be engaged by the wrench, whereby to throw the pawl as the wrench is applied.

3. In a hub-attaching device, the combination of a collar having a ratcheted flange, and means for holding the collar in place, such means comprising a head turning on the collar and having an angular portion to be engaged by a wrench and a pawl mounted in the head and working with the ratcheted flange of the collar, the pawl having a portion projected from the angular portion of the head, whereby as the wrench is engaged with such angular portion of the head the pawl is actuated to disengage the ratcheted flange of the collar.

4. In a hub-attaching device, the combination of a collar and means for holding the collar in place, such means comprising a spindle extended centrally through the collar, a head attached rigidly to the spindle and having an angular portion to be engaged by a wrench, and a pawl carried by the head and engaging the collar to hold the head and flange, a portion of the pawl being projected from the angular portion of the head to be engaged by the wrench, whereby to operate the pawl.

In testimony whereof we have signed our names to this specification in the presence of two subscribing witnesses.

JOHN A. WEITZEL.
ULYSSES G. SMITH.

Witnesses:
W. E. MECK,
FRANK MAGILL.